Nov. 1, 1927.

J. F. JOHNSON

COUPLING

Filed July 31, 1924

1,647,136

WITNESSES:

J. F. Johnson
INVENTOR

BY

ATTORNEY

Patented Nov. 1, 1927.

1,647,136

UNITED STATES PATENT OFFICE.

JOSIAH F. JOHNSON, OF SWARTHMORE, PENNSYLVANIA, ASSIGNOR TO WESTINGHOUSE ELECTRIC & MANUFACTURING COMPANY, A CORPORATION OF PENNSYLVANIA.

COUPLING.

Application filed July 31, 1924. Serial No. 729,385.

My invention relates to couplings, particularly to shaft couplings which are inherently capable of accommodating themselves to small errors in alignment of members to be coupled, and it has for an object to provide apparatus of the character designated which shall be capable of transmitting large shaft horse powers and which shall include means whereby the connected shaft sections may be readily disconnected and rotational movement of the shaft sections permitted.

Figure 1:
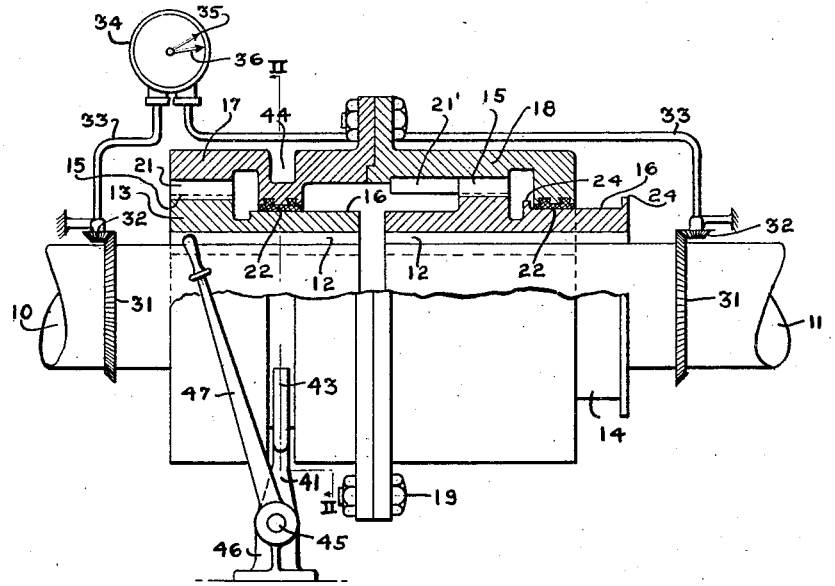
Figure 2:
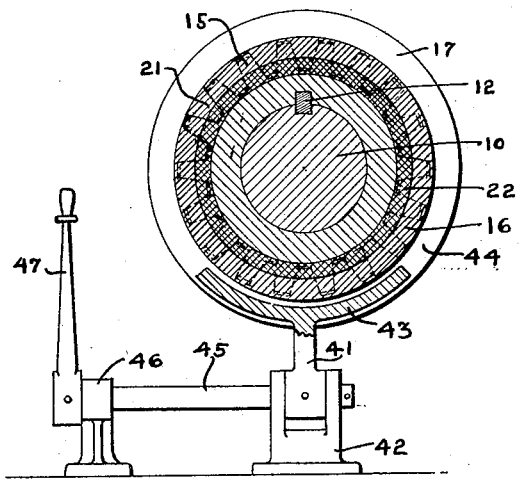

These and other objects which will be made more apparent throughout the further description of the invention, may be attained by the employment of the apparatus hereinafter described and illustrated in the accompanying drawings in which Fig. 1 is a view partly in section and partly in elevation of one form of my novel coupling; and Fig. 2 is a transverse sectional elevation taken on the line II—II of Fig. 1.

In numerous power plants and in particular those plants in which both water and steam turbines are employed for driving the respective generators and in which, during periods of low power demand or of adequate water supply, the generators driven by the steam turbines remain inactive, it is known that the power factor of the active generators may be increased by utilizing the inactive generators as synchronous condensers. In order to effectively thus employ the inactive generators, it becomes advantageous to provide some means for readily disconnecting the respective generators from their driving turbines. I have therefore provided a coupling which is inherently capable of accommodating itself to small errors in alignment of members to be coupled, which is capable of transmitting adequate torque and which possesses the added advantage of construction in that it permits of the turbine and generator being readily disconnected without interfering with the rotary movement of either. Suitable means may be provided for synchronizing the speed of the generator and turbine prior to re-connecting the same. It is therefore apparent that the efficiency of many generating stations may be materially increased by employing the form of coupling herein disclosed.

Referring to the drawing for a more detailed description of my invention, I show in Figs. 1 and 2 adjacent shaft sections 10 and 11 which have rigidly secured thereto, as by suitable keys 12—12, coupling heads 13 and 14, respectively. Provided on the outer surface of each of the coupling heads 13 and 14 is a plurality of radially-extending teeth 15 and a bearing ring 16. Surrounding the coupling heads 13 and 14 is a muff member which may be formed by two annular torque-transmitting members 17 and 18 which are rigidly connected by bolts 19—19 and act as a single integral element. Provided respectively in the bore of the thrust transmitting members 17 and 18 is a plurality of inwardly-extending teeth 21 and 21' which mesh with the teeth 15 provided on the coupling heads. Also provided in the bore of the torque-transmitting members 17 and 18 are bearings 22 which slidably engage the bearing rings 16 and permit relative rotational and longitudinal movements therebetween. The teeth 21' of the torque-transmitting member 18 may be made longer than the cooperating teeth 15 in order that they may always be maintained in meshing relation.

From the above description it is apparent that the torque-transmitting members 17 and 18 may be readily moved in a longitudinal direction a sufficient distance to entirely disengage the teeth 21 from the teeth 15, thereby permitting the shaft sections 10 and 11 to rotate relative to each other. The bearing rings and bearings 16 and 22, and the meshing teeth 15 and 21', cooperate to maintain the coupling heads and the torque-transmitting members in such relative positions that the teeth 15 and 21 may be readily reengaged without any difficulty. Stop members 24—24 are provided upon the coupling head 14 for preventing excessive longitudinal movement of the torque-transmitting members.

In order to assist in synchronizing the speed of the shaft sections 10 and 11 preparatory to re-engaging the teeth 15 and 21, I may provide any suitable speed indicating mechanism such as, for example, a gear 31 which is secured to each of the shaft sections 10 and 11 and which drives, through a gear 32 and a flexible shaft 33, a revolution counter 34 of any desired type. The counter 34 is provided with two indicators 35 and 36 which represent the rotational speed of the respective shaft sections and by so adjusting the speed of the rotating shaft sections that the indicators 35 and 36 assume a fixed relation, re-engagement of the teeth 15 and 21 may be facilitated.

Various forms of mechanical systems may be provided for moving the torque-transmitting members 17 and 18. The system illustrated comprises a lever 41 which is pivotally supported in a fixed bracket 42. The lever 41 is provided with an arcuate portion 43 disposed within a circular groove 44 provided in the torque-transmitting member 17. A hand lever 47 is provided for oscillating the lever 41 and a shaft 45 supported in a fixed bracket 46 connects the levers 41 and 47. In larger couplings power means may be substituted for manipulating the couplings. The arrangement of levers is such that the rotary movements of the coupling are not retarded and the shaft sections may be connected or disconnected at all times.

While I have described my coupling as being provided with meshing teeth, it is to be understood that my invention is not confined solely to the specific form of engaging means illustrated. The coupling disclosed herein is capable of permitting small relative displacements of the shaft sections 10 and 11, the ordinary bearing clearance or tolerance between the bearing rings 16 and the bearings 22 being sufficient for this purpose. The design is such that with the teeth 15 and 21 in mesh, either shaft section with its associated coupling head may, by removing the bolts 19, be laterally displaced without disturbing the remaining shaft section.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a disconnectable coupling which is capable of accommodating itself to small errors in alignment of members to be coupled, the combination of a pair of coupling members, a sleeve-like muff member telescopically arranged with respect to the coupling members, torque transmitting connections between the interior of said muff member and the respective coupling members, each connection including relatively axially movable elements on the muff member and on a coupling member, and bearing means arranged between the muff member and the respective coupling members for supporting the muff member in axially slidable relation on the coupling members.

2. In a disconnectable coupling which is inherently capable of accommodating itself to small errors in alignment of members to be coupled, the combination of a pair of coupling members, a muff member, a row of external teeth on each coupling member, rows of internal teeth on the muff member for cooperation with the respective rows of teeth on the coupling members, and bearing means arranged between the muff member and the respective coupling members for supporting the muff member in axially slidable relation on the coupling members.

3. In a disconnectable coupling which is inherently capable of accommodating itself to small errors in alignment of members to be coupled, the combination of a pair of coupling members each having a row of external teeth and a relatively longer and axially-extending bearing portion and the bearing portions being arranged on like sides of the teeth, and a muff member movable axially with respect to the coupling members and having rows of internal teeth and bearing portions for cooperation with the teeth and bearing portions of the coupling members.

4. In a disconnectable coupling which is inherently capable of accommodating itself to small errors in alignment of members to be coupled, the combination of a pair of coupling members each having a row of external teeth and a relatively longer axially-extending bearing portion, a muff member movable axially with respect to the coupling members and divided transversely into two parts having internal teeth and bearing portions cooperating, respectively, with the teeth and bearing portions of the coupling members, and means for securing the muff member parts together.

5. In a disconnectable coupling which is inherently capable of accommodating itself to small errors in alignment of members to be coupled, the combination of a pair of coupling members each having a row of external teeth and a relatively longer and axially-extending bearing portion and the bearing portions being arranged on like sides of the teeth, an axially movable muff member having rows of internal teeth and bearing portions for cooperation with the teeth and bearing portions of the coupling members, and abutment means for limiting axial movement of the muff member with respect to the coupling members, one of said rows of internal teeth extending axially a greater distance than the extent of axial movement of the muff member so that the latter teeth are maintained in mesh with the cooperating row of external teeth on the corresponding coupling member.

6. In a disconnectible coupling which is inherently capable of accommodating itself to small errors in alignment of members to be coupled, the combination of first and second coupling members, a muff member, a first row of external teeth on the first coupling member, a second row of external teeth on the second coupling member, first and second rows of internal teeth on the muff member for engagement with the first and second rows of external teeth, an axially-extending bearing portion carried by the first coupling member and being located between the first and second rows of external teeth, and a bearing portion on the muff member arranged between the first and second rows of internal teeth thereof and cooperating with said coupling member bearing portion, the relative lengths of the second rows of external and internal teeth being such that, while remaining in engagement, the muff member may be moved to disengage the first row of internal teeth from the first row of external teeth.

7. In a disconnectible coupling, the combination of coupling members adapted to be secured to elements to be coupled, each of said coupling members having independent coupling and bearing portions, an axially movable coupling member divided transversely into first and second parts having, respectively, coupling and bearing portions for engagement with the coupling and bearing portions of the first coupling members, and means for connecting said first and second parts together, one of said coupling portions being of greater length in an axial direction than the other coupling portions, whereby the axially movable coupling member may be engaged and disengaged with respect to one of said first coupling members while being maintained in engagement with the other of said first coupling members.

8. In a disconnectible coupling, the combination of first and second coupling members adapted to be secured to elements to be coupled, each of said coupling members having independent coupling and bearing portions, and a third coupling member having coupling portions for engagement with the coupling portions of said first and second coupling members and having bearing portions for cooperation with the bearing portions of said first and second coupling members, said third coupling member being movable axially relatively to the first and second coupling members for engaging and disengaging one of its coupling portions with respect to one of the coupling portions of the first and second members.

9. In a disconnectible coupling, the combination of first and second coupling members adapted to be secured to elements to be coupled, each of said coupling members having independent coupling and bearing portions and the bearing portions thereof being located on like sides of the coupling portions, and a third coupling member having coupling portions for engagement with the coupling portions of the first and second coupling members and having bearing portions located on like sides of the coupling portions thereof for engagement with the bearing portions of the first and second coupling members, said third coupling member being slidable relatively to the first and second coupling members to engage and disengage one of its coupling portions with respect to the coupling portion of the first coupling member while maintaining its other coupling portion in engagement with the coupling portion of the second coupling member.

10. In a disconnectible coupling, the combination of first and second coupling members adapted to be secured to elements to be coupled, each of said coupling members having independent coupling and bearing portions, a third coupling member having coupling portions for engagement with the coupling portions of the first and second coupling members and having bearing portions for engagement with the bearing portions of the first and second coupling members, means for moving the third coupling member axially to engage and disengage one of its coupling portions with respect to the coupling portion of the first coupling member while maintaining engagement of its other coupling portion with respect to the coupling portion of the second coupling member, and means for limiting axial movement of the third coupling member.

In testimony whereof, I have hereunto subscribed my name this 29th day of July 1924.

JOSIAH F. JOHNSON.